April 5, 1966  W. K. ENGLISH  3,245,035
PROGRAMABLE SEQUENCE DETECTOR
Filed Nov. 13, 1962  3 Sheets-Sheet 1

INVENTOR.
WILLIAM K. ENGLISH
BY Samuel Lindenberg
ATTORNEY

April 5, 1966

W. K. ENGLISH 3,245,035

PROGRAMABLE SEQUENCE DETECTOR

Filed Nov. 13, 1962

3 Sheets-Sheet 2

INVENTOR.
WILLIAM K. ENGLISH
BY
ATTORNEY

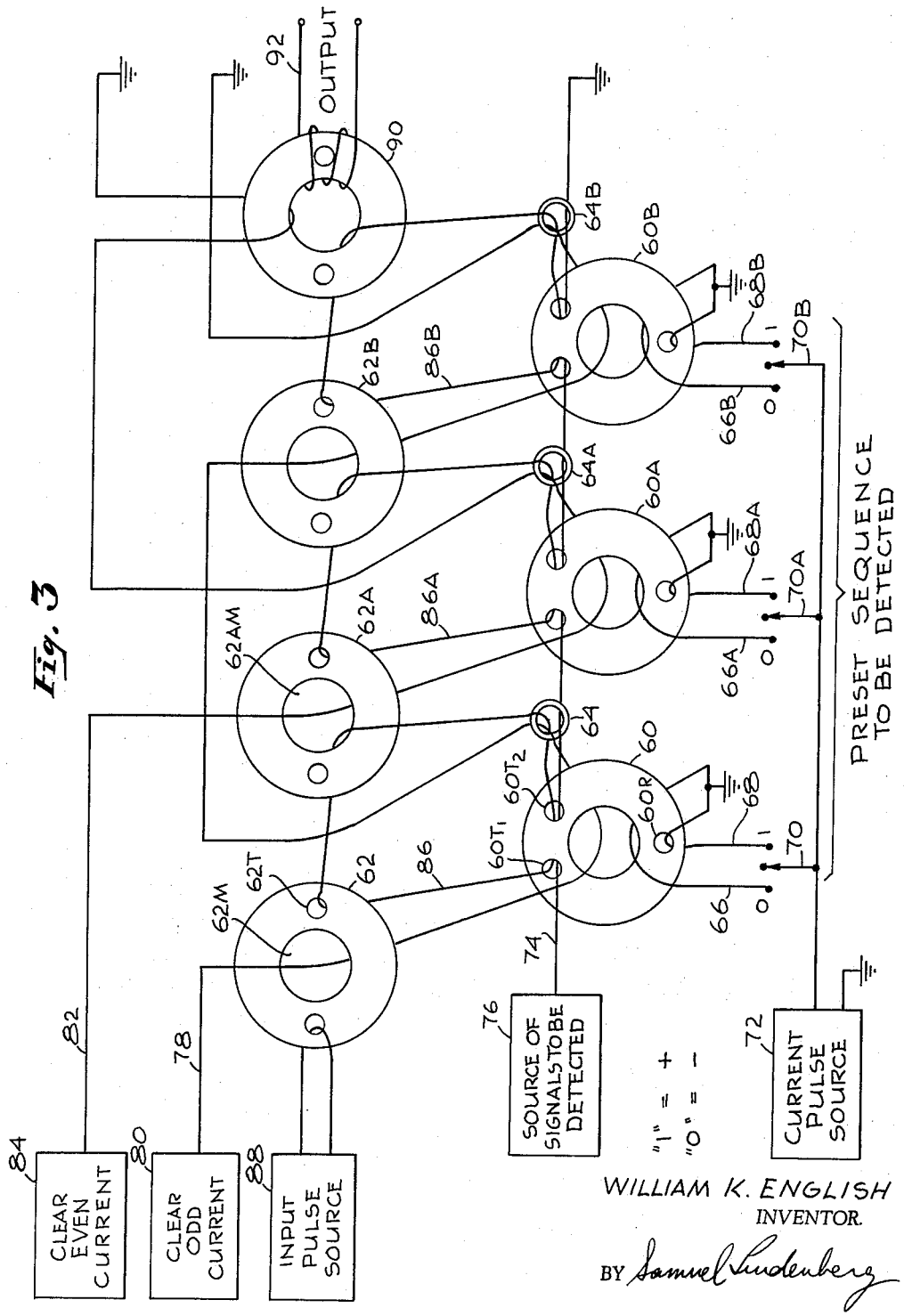

United States Patent Office 3,245,035
Patented Apr. 5, 1966

3,245,035
PROGRAMABLE SEQUENCE DETECTOR
William K. English, Menlo Park, Calif., assignor to AMP Incorporated, Harrisburg, Pa., a corporation of New Jersey
Filed Nov. 13, 1962, Ser. No. 237,103
8 Claims. (Cl. 340—146.2)

This invention relates to magnetic circuit arrangements for detecting a predetermined signal sequence, and more particularly to improvements therein.

The purpose of a sequence detector circuit is to recognize the occurrence of signals in a predetermined sequence and to provide indication thereof. Circuits have been devised for this purpose which perform the required detection function satisfactorily. However, these circuits, once they have been wired for a particular sequence are fixed and cannot be easily altered to detect any other signal sequence. Thus, should circumstances arise, as they often do, where a different sequence is to be detected, considerable effort is necessary to modify the previous sequence detector to detect another sequence.

It is an object of this invention to provide a sequence detector having the capability of detecting more than one sequence.

It is another object of the present invention to provide a sequence detector which is alterable in a very simple fashion to detect any desired sequence.

Yet another object of the present invention is the provision of a novel programable sequence detector.

These and other objects of the present invention may be achieved in an arrangement wherein the sequence detector comprises a plurality of sequentially interconnected stages. Each different stage includes magnetic core elements which are interconnected in a manner so that a magnetic core element in stage may be set in a one or the other of its two states of magnetic remanence representative of a ONE or a ZERO binary bit which is desired to be detected by that stage. Thereafter, the binary signals are applied alternately with advancing signals to the stages of the sequence detector. If a proper sequence of binary signals has been applied to the sequence detector, then the last stage provides an output indicative thereof.

Figure 1:
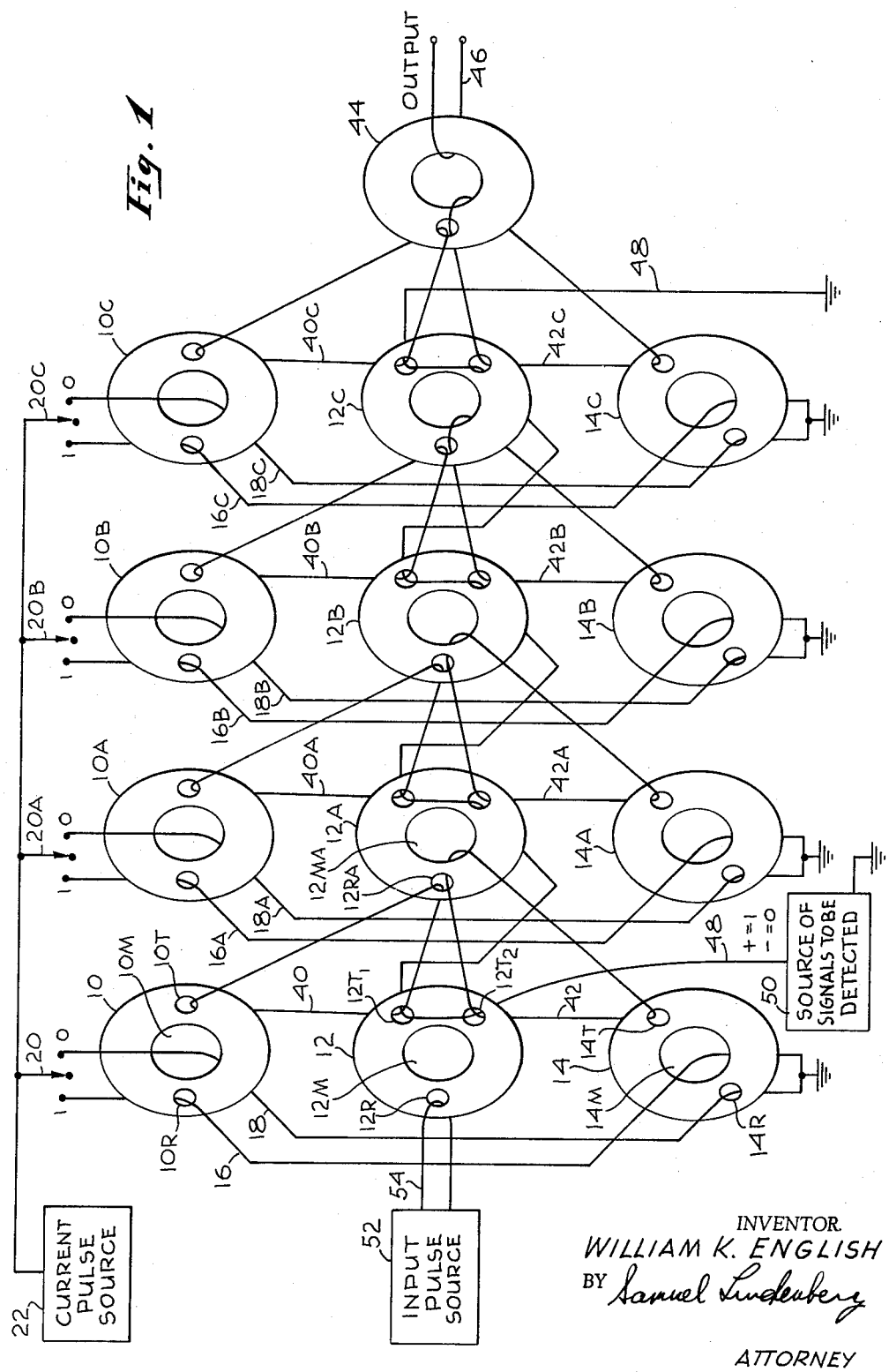
Figure 2:
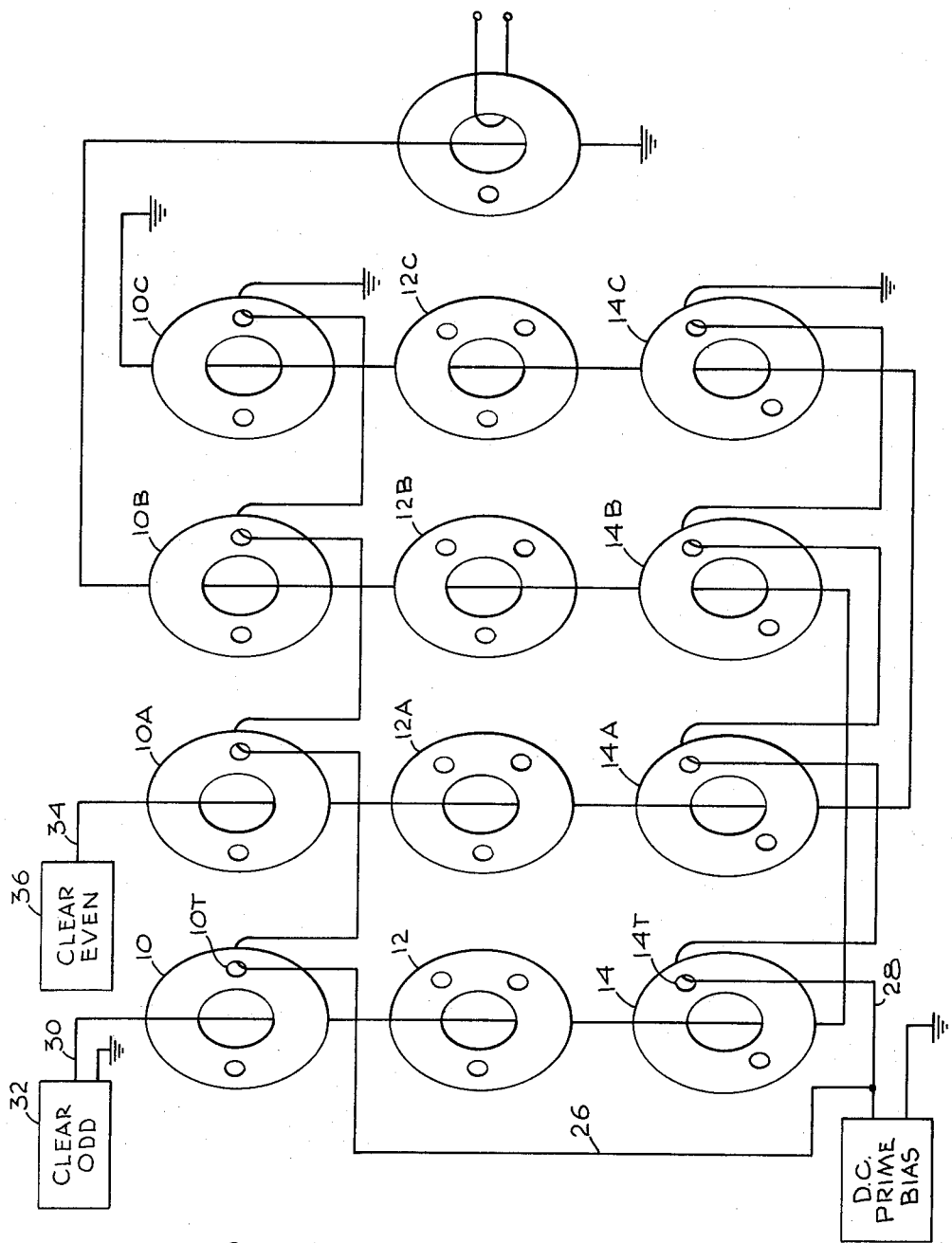

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 and FIGURE 2 constitute a circuit diagram of an embodiment of the invention which is shown in two figures for the purpose of simplifying an explanation of the invention as well as for eliminating confusion in the drawings.

FIGURE 3 is a circuit diagram of a second embodiment of the invention.

In FIGURE 1 and FIGURE 2 there are represented an identical set of magnetic cores of the type known as multi-aperture devices. However, the windings which are shown in FIGURE 1 and FIGURE 2 are different. The reason, as indicated previously for drawing the embodiment of the invention in separate figures is, because if all the windings for the cores were shown on the one figure, the drawing would be confusing to understand and to describe.

The embodiment of the invention which is represented by FIGURE 1 and FIGURE 2, by way of illustration, show a sequence detector for detecting four binary bits. This is not to be construed as a limitation on the invention, since it will be clear to those skilled in the art how the sequence detector may be extended to detect any number of binary bits. It has been indicated that the sequence detector in accordance with this invention is programable. By that is meant, that the sequence detector can be programed to detect any desired sequence. The sequence detector comprises a plurality of stages interconnected in a sequence. In each stage there are three toroidal magnetic cores respectively 10, 12, and 14. These cores are made of magnetic ferrite material having two states of magnetic remanence and substantially rectangular hysteresis characteristics. The core 10 has a central or main aperture 10M and two terminal apertures respectively designated as 10R and 10T. The core 14 similarly has a central aperture 14M and two terminal apertures respectively designated as 14R and 14T. The core 12 has a central aperture 12M and three terminal apertures respectively designated as 12R, 12T$_1$ and 12T$_2$.

Some standard terminology has been applied to the magnetic flux states of multi-aperture cores. A multi-aperture core may be considered as having two separate flux paths about the main aperture. A multi-aperture core will be considered in its clear state (storing a ZERO) when the magnetic flux in both flux paths is circulating in the same direction. A multi-aperture core is said to be in its set state (storing a ONE) when the magnetic flux in the two paths circulates in opposite directions around the main aperture. A multi-aperture core is said to be in its primed state when the magnetic flux around the transmitting aperture (10T or 14T or 12T$_1$ and 12T$_2$) circulates in a direction in reverse to the flux direction when the core was placed in its set state.

In order to program a stage of the sequence detector to detect a ONE binary bit, core 10 is driven to its set state, core 14 is driven to its clear state. In order to set a stage of the sequence detector to detect a ZERO then core 10 is placed in its clear state and core 14 is placed in its set state. By way of example of an arrangement for establishing a desired state of the stage, a "ONE setting winding" 16 and a "ZERO setting winding," 18 are employed. The winding 16 passes through the aperture 10R of core 10 and then through the main aperture 14M of core 14. The winding 18 passes through the main aperture 10M of core 10 and then through the aperture 14R of core 14. The windings may be selectively energized by means of a selector switch 20 which is connected to a current pulse source 22. Connecting the selector switch 20 to the winding 16 enables a current pulse from the source 22 to drive the core 10 to its set state and core 14 to its clear state. As may be seen in FIGURE 2, a D.C. prime bias source 24 applies a priming bias current to a priming winding 26 which passes through the terminal aperture 10T and into a second priming winding 28 which passes through the terminal aperture 14T. Accordingly, core 10 is primed immediately after being driven to its set state.

To render the first stage of the sequence detector in condition to detect the arrival of a ZERO in a sequence the selector switch 10 is moved to connect with the winding 18. As previously indicated this serves to drive core 10 to its clear state and to drive core 14 to its set state. As may be seen in FIGURE 2, core 14 is primed by the application of the prime bias to the winding 28.

In FIGURES 1 and 2 four stages of a sequence detector are shown. These stages are identical with the first stage which has been described, and the structures thereof bear the identical reference numerals except that a letter is appended to the reference numeral to indicate its position in the sequence. Thus, magnetic cores 10A and 14A correspond to magnetic cores 10 and 14 in the first stage of the sequence detector. These cores may be set to the magnetic condition whereby the second stage will detect a ONE by actuating the switch 20A to apply a current pulse to the winding 16A. The stage may be set to detect a ZERO by actuating switch 20A to apply a current pulse to the winding 18A. The operation of switches 20B and 20C in conjunction with the respective winding 16B, 18B, and 16C, 18C should also be clear from the foregoing description.

As may be seen in FIGURE 2, the priming winding 28 extends through all the terminal apertures of the cores 14, 14A, 14B, and 14C so that whenever they are driven to their ONE state they will be automatically primed. Similarly, the winding 26 extends through the terminal apertures of the cores 10, 10A, 10B and 10C so that whenever they are driven to their set state they are automatically primed. A clear odd drive winding 30 passes through the main apertures of the cores in all of the odd stages of the sequence detector. A current pulse from a clear odd pulse 32 is applied to the winding 30 for the purpose of driving the cores to which this winding is coupled, to their clear state. A clear even winding 34 is inductively coupled to all the cores in the even sections of the sequence detector by passing through their main apertures. This winding is driven by current from a clear even pulse source 36 and serves to drive these cores to their clear states.

Referring again to FIGURE 1, a first transfer winding 40 is inductively coupled to cores 10, 12 and 12A by passing through the aperture 10T, $12T_1$ and 12Ra with a coupling sense that assuming a current flows through this winding a magnetic flux would be established around the aperture $12T_1$ with a direction opposite to the establishment of magnetic flux around the aperture 10T. A second transfer winding 42 is inductively coupled to the cores 12, 14, and 12A by passing through the aperture $12T_2$, the aperture 14T, the main aperture 12MA and through the input aperture 12RA. Here too, the sense of the coupling to the cores 12, 14 is such that assuming a current flow through the winding 42 the direction of magnetic flux around the aperture $12T_2$ which would be established as a result, would be opposite to the direction of magnetic flux around the aperture 14T.

Each stage of the sequence detector is inductively coupled to the succeeding stage by means of the two transfer windings 40 and 42. The last stage of the sequence detector has two transfer windings 40C and 42C which are inductively coupled to an output core 44 in the same manner as these transfer windings are inductively coupled to a succeeding stage. The output core 44 has an output winding 46 and may be driven to indicate whether or not a sequence has successfully occurred by the clear odd winding 30.

A priming winding 48, is inductively coupled to the two output apertures of each one of the cores 12, 12A, 12B and 12C in a manner so that, assuming a direction of current flow in this winding the magnetic flux direction which would be established around the aperture $12T_1$ for example, is opposite to the magnetic flux direction which is established around the aperture $12T_2$. The priming winding is driven by signals from a source of signals 50. These are signals which occur in a sequence to be detected. These signals may be positive going to represent a ONE and negative going to represent a ZERO. Thus, the direction of current flow for a ONE binary bit in the signal sequence is from the source of signals through the winding 48 to ground, and the current flow is in a reverse direction upon the application of a ZERO binary bit representative signal to this winding.

Assume now, for the purpose of explaining the operation of this invention, that the first stage of the sequence detector is set to detect a ONE, by reason of the switch 20 having been momentarily connected to the winding 16 to apply a current pulse thereto, whereby core 10 is driven to its set state and then to its prime state while core 14 remains in its clear state. Assume thereafter, that a pulse is applied from an input pulse source 52, to an input winding 54 which drives core 12 to its set state. The source of signals to be detected must then apply the first binary bit signal to the winding 48. If this is positive, representative of a ONE, then the lower output aperture $12T_2$ of core 12 is primed. The next operation is that of the clear odd current pulse source which applies a current pulse to the winding 30. This drives core 12 to its clear state. This causes a voltage to be induced in the transfer winding 42 in response to which a current flows in a direction which tends to drive core 12A to its set state. Since core 14 is in its clear state it does not contribute any voltage to the winding 42. Core 10 also is driven to its clear state by the current in winding 30 with a resulting current flow being induced in the winding 40. The direction of this current flow however, is such as to have no effect on core 12A since the flux around the outer leg adjacent to aperture 12RA is in the direction that the current in the winding 40 tends to drive the flux.

If a ZERO binary representative signal were applied to the winding 48 then the upper output aperture $12T_1$ of the core 12 would be primed. The occurrence of the clear odd current on the winding 30 would drive both cores 10 and 12 to their clear states. In response thereto, voltages would be induced in the transfer winding 40 which are in opposite directions and thus no current would result. Core 12A would therefore remain in its clear state. There would be contribution in the lower coupling loops since core 14 is in the clear state and the lower aperture of core 12 is not primed. Thus core 12A is not set by either coupling loop. A transfer of the set state from core 12 to core 12A occurs only if the stored information in the first stage of the sequence detector and the first binary bit of the sequence are identical.

Assuming that the first stage of the register was set in its ZERO storage state whereby core 10 is in its clear state and core 14 is in its primed state, then the application of a ZERO binary signal to the winding 48 will cause the priming of aperture $12T_1$. Upon application of a current pulse to the clear odd winding 30 a current flow will be induced in the winding 40 which will tend to drive the core 12A to its set state. A current flow in the winding 42 as the result of the core 14 being driven to its clear state from its primed state, will have no effect on core 12A since the inner leg of the core around which the winding 42 is wound, has its magnetic flux circulating in the direction to which the current flow induced in this winding tends to set the flux.

Upon occurrence of a ONE binary bit at the input to the primary winding 48 prior to the clear odd winding being excited then the lower aperture $12T_2$ is primed. As a result, upon the occurrence of the clear odd winding current, current flows are induced in opposite directions in the transfer winding 42 from the core 12 and the core 14. The core 12A remains unaffected and in its ZERO state.

Since the subsequent stages of the sequence detector are identical with the stage just described, the manner wherby in response to the occurrence of a proper sequence the set state of core 12 is transferred to core 12A, to core 12B, to core 12C and finally to core 44, should be apparent. Should an improper binary bit occur in the sequence being inspected then at the end of the sequence inspection interval no output will occur in core 44. Otherwise, if the sequence being inspected is in accordance with the sequence stored in the sequence detector an output will be obtained on the winding 46 at the end of the inspection interval. Obviously the switches 20, 20A, 20B and 20C are exemplary of suitable electronic switching devices which may be employed for storing a sequence in the sequence detector which is to be detected. This sequence detector is programable so that as soon as one sequence has been detected another one may set into the sequence detector. Thus, the sequences to be detected may be programed in advance as desired.

Each stage of the sequence detector described above, has bit storage cores and a sequence core. The signal on the priming winding is stored as the remanence state of the magnetic material about a terminal aperture of the sequence core. A clearing drive to all the cores produces a "valid" sequence signal output only if the sequence core has been storing a valid sequence signal and the stored bit and the stored priming winding signal are identical.

FIGURE 3 shows a circuit diagram for another embodiment of a sequence detector in accordance with this invention. This sequence detector also includes a plurality of stages with the capability of storing in each stage a ZERO or ONE in accordance with the sequence to be detected. However, only a single storage core is employed in this embodiment of the invention as contrasted to two storage cores in the preceding embodiment of the invention. Thus, considering the first stage it includes a storage core 60, a sequencing core 62 and a small toroidal core 64. The corresponding structures in the following stages of the sequence detector have the same reference numerals as the reference numerals in the first stage except that they have a letter associated therewith, indicative of the stage of the sequence in which they belong.

Only three stages of the sequence detector are shown in FIGURE 3, by way of example. More or less of these stages can be employed as required.

A ZERO setting winding 66 is inductively coupled to the storage core 60 and passes through its main aperture. A ONE setting winding 68 is inductively coupled to the storage core 60 and passes through its input aperture 60R. The windings 66 and 68 connect to two terminals respectively designated as ZERO and ONE of a selector switch 70. The selector switch can apply current from a current pulse source 72 to either the ZERO or ONE winding respectively 66, 68, whereby the magnetic core 60 is driven to its set or clear state. The core 60 also has two terminal apertures respectively 60T$_1$ and 60T$_2$. A priming winding 74 passes through the apertures 60T$_1$ and 60T$_2$ and core 64 and thereafter is coupled in that order to all of the storage cores 60A, 60B, 64A, 64B. The sense of the coupling of this priming winding 74 to the respective cores is such that assuming a direction of current flow therein the direction of the magnetic flux which would be established around the aperture 60T$_1$ is opposite to the direction of magnetic flux which would be esablished around the aperture 60T$_2$ in response to such current flow.

A source of signals 76 to be detected, applies binary current pulses to the winding 74. These binary current pulses are positive, to represent a ONE binary bit, and are negative to represent a ZERO binary bit. As a result, current will flow in one direction through the priming winding 74 in response to the binary ONE, and in the opposite direction in response to the binary ZERO. It should be also noted that the priming winding 74, in addition to passing through the aperture 60T$_1$ and 60T$_2$ of a storage core in a stage, also passes through the small toroid core 64 and then through the terminal apertures of the next storage core in the next stage of the sequence detector. The sense of the coupling of the priming windings to the toroidal core 64 is oppoiste to the sense of the coupling of the priming winding to aperture 60T$_2$ of storage core 60 and a similar coupling relationship exists in connection with cores 64A and the apertures in core 60A, and core 64B and the apertures in core 60B.

The clear odd winding 78 passes through the main apertures of the sequencing core 62, the storage core 60 and the small toroid 64 of each one of the odd numbered stages of the sequence detector. A clear odd current source 80 applies current pulses to the clear odd winding 78 when required. Similarly a clear even winding 82 is inductively coupled to the cores in each even numbered state in the sequence detector.

A transfer winding 86 is inductively coupled to all the cores in a stage and also to the sequence core of the succeeding stage. This winding passes through the output aperture 62T of the core 62, through the apertures 60T$_1$ and 60T$_2$ of the core 60, through the small toroidal core 64 and through the main aperture 62AM of the sequence core in the succeeding stage. The sense of the coupling of aperture 60T$_1$ is opposite to that of 60T$_2$.

The sense of the coupling of the small toroid 64 is the same as the sense of the coupling to the aperture 60T$_2$.

The desired sequence to be detected is inserted into the storage cores 60, 60A, 60B by the setting of the switches 70, 70A, and 70B. The core 62 is driven to its set state by a signal from an input pulse source 88. Thereafter, the operation of detecting the sequence of signals from the source 76 can commence. Assume now that it is desired that the first stage detect a ONE binary signal. The switch 70 is then connected to the winding 68 whereby the core 60 is driven to its set state. Thereafter, the signal from the source of signals to be detected is applied to the priming winding 74. If this is a ONE representative signal the magnetic material around the apertures 60T$_1$ is primed and the toroidal core 64 is driven to its ONE representative state. Then current is applied to the clear odd winding 78 from the current source 80. Cores 62, 60, and 64, in response thereto, are all driven to their clear states and as a result induce voltages into the transfer winding 86. The sense of the coupling of the winding 86 to the small core 64 and to the aperture 60T$_1$ is opposite therefor, the currents produced by switching these oppose one another and substantially cancel. This leaves uncancelled current provided by the switching of core 62 whereby the succeeding core 62A is driven to its set state.

Assuming now that a ZERO binary signal were received by the priming winding 74 then this would prime the magnetic material around the aperture 60T$_2$ but toroidal core 64 would be left in its clear state. Accordingly, when the clear drive is applied to the winding 78, the currents induced in the transfer winding 86 are those which occur as a result of the clear drive applied to the core 62 an dthe core 60. The sense of the coupling of the transfer winding to apertures 62T and 60T$_2$ is opposite and therefor no current is induced in the transfer winding and core 62A is not switched to its set state.

Assume now that the core 60 is driven to its clear state in response to a setting of switch 70. A ONE binary representative signal applied to the priming winding 74 will not prime the core 60 since it is in its clear state. However, the core 64 will be driven to its ONE state. Upon the occurrence of the clear drive to the winding 78 the currents induced in the transfer winding oppose one another and cancel. These currents are caused by the clear odd drive causing cores 62 and 64 to be driven to their clear states.

Upon the occurrence of a ZERO representative signal at the source 76, the aperture 60T of core 60 is not primed since core 60 is in its clear state and the toroid 64 is not primed. The drive current applied to the odd drive winding 78 will only drive the magnetic core 62 to its clear state and therefore the current induced in the transfer winding will be able to drive the succeeding core 62A to its set state.

From the foregoing description it should be obvious how the sequence detector shown in FIGURE 3 is operated to detect the sequence which has been entered into the switches 70, 70A and 70B. The last sequence detecting stage drives the core 90 to its set state, if the sequence that occurred matches the sequence that has been programmed or stored into the sequence detector. Thus, upon the occurrence of the clear even current the winding 82 will clear the core 90 whereby a voltage will be induced in the output winding 92 indicative of a successful sequence detection cycle.

Each stage of the sequence detector of FIGURE 3 has magnetic storage for the binary bit to be detected, has a sequence core and also provides storage for a signal on the priming winding. Upon the application of a clearing signal, if the sequence core was storing a valid sequence signal and if the stored binary bit and priming signal are identical, then a valid sequence signal is applied to a succeeding stage.

From the foregoing description it should be appreciated that a novel and useful sequence detector has been described which can be altered in a very simple fashion to detect any desired sequence.

I claim:

1. A sequence detector for binary signals in a sequence comprising a plurality of detecting stages each stage being assigned to detect a different signal in said sequence, means for applying to each stage a representation of the binary signal to be detected thereby, means in each stage for storing a representation of the binary signal it is to detect, means for applying to a first stage in said sequence detector a valid detection signal, means in each stage for storing a valid detection signal, priming winding means for applying to all stages a sequence of binary signals to be detected, means in each stage for storing a binary signal applied by said priming winding means, means for applying clearing signal alternately to alternate stages of said register to cause all of the storing means in a stage to produce output signals indicative of the signals stored in said stage, and means responsive to (a) a clearing signal, (b) a valid detection signal produced from the previous stage, stored in said stage, (c) a signal representing the identity of a stored signal to be detected and an identical stored signal, the latter received from said priming winding means, for applying a valid detection signal to the succeeding stage for storage.

2. A sequence detector for binary signals in a sequence comprising a plurality of stages in sequence each stage including means for storing a sequence signal, magnetic storage means having a ZERO and a ONE state of magnetic remanence, means for driving each magnetic storage means to a state of remanence representative of one of the binary signals to be detected in said sequence, priming winding means for applying binary signals to be detected to all the stages of said sequence detector, means at each stage responsive to a binary signal from said priming winding means for storing an indication thereof, means for applying a magnetomotive drive alternately to alternate stages of said register, means responsive to the presence of all of the following: (a) a magnetomotive drive from said means for applying a magnetomotive drive, (b) a sequence signal produced from the previous stage, stored in said stage, (c) a signal representing the state of remanence of the one of the binary signals to be detected in said sequence and an identical storage signal, the latter received from said priming winding means for applying a sequence signal to the succeeding stage for storage.

3. Apparatus for detecting signals in a predetermined sequence comprising a plurality of detecting stages each detecting stage including magnetic storage means having a ZERO representative storage state and a ONE representative storage state, means for establishing each said magnetic storage means in a representative state corresponding to the signal to be detected in said predetermined sequence of signals by the particular stage of said sequence detector and a magnetic sequence core having a set state and a clear state, means for establishing the magnetic sequence core in the first stage of said sequence detector in its set state, priming winding means inductively coupled to all the magnetic sequence cores of said sequence detector, means for applying the signals representative of the sequence to be detected to said priming winding means, means for alternately driving the magnetic storage means and magnetic sequence cores in alternate stages of said sequence detector to their respective ZERO and clear states, transfer winding means coupling the magnetic storage means and sequence core of one stage to the sequence core of a succeeding stage for driving said sequence core of said succeeding stage to its set state in response to a clear drive by said means for alternately driving having been applied to the sequence core in the preceding stage when said core was in its set state and a signal had been applied to said priming winding means having the same binary representation as is represented by the state of said storage means.

4. Apparatus for detecting a sequence of binary signals comprising a sequence detector having a separate stage assigned for detecting each signal in said sequence, each stage including a magnetic storage means having a ZERO representative state of magnetic remanence and a ONE representative state of magnetic remanence, a sequence core having a clear state of magnetic remanence, a set state of magnetic remanence, and a prime state, means for establishing said magnetic storage means in the state of magnetic remanence representative of the binary signal to be detected by said stage, means for driving the sequence core in a first stage of said apparatus to its set state of magnetic remanence, priming winding means inductively coupled in sequence to all the sequence cores of said sequence detector, means for applying binary signals in the sequence to be detected to said priming winding means whereby said sequence core is primed, means to apply a magnetomotive force to said transfer core and to said storage means to respectively drive them to their clear state and to their ZERO representative state of remanence, and transfer winding means coupling said storage core and said sequence core to the sequence core of a succeeding stage for driving said sequence core of said succeeding stage to its set state responsive to said means for applying a magnetomotive force if a binary signal in said sequence representing the same binary digit as was represented by the state of said storage core had been applied to said priming winding by said means for applying binary signals.

5. Apparatus for detecting a sequence of binary signals comprising a sequence detector having a separate stage assigned for detecting each signal in said sequence, each stage including a magnetic storage means having a ZERO representative state of magnetic remanence and a ONE representative state of magnetic remanence, a sequence core having a clear state of magnetic remanence, a set state of magnetic remanence, and a prime state, means for establishing said magnetic storage means in the state of magnetic remanence representative of the binary signal to be detected by said stage, means for driving the sequence core in a first stage of said apparatus to its set state of magnetic remanence, an auxiliary magnetic core having set state of magnetic remanence, priming winding means inductively coupled in sequence to the storage means and auxiliary core of each stage of said sequence detector, means for applying binary signals in the sequence to be detected to said priming winding means whereby said auxiliary core is driven to one of its two states of magnetic remanence responsive to said signals on said priming winding means, means for each stage to apply a magnetomotive drive to said transfer core, said magnetic storage means and to said auxiliary core to drive them to their respective clear states, ZERO state and clear state of remanence, and transfer winding means coupling said transfer core, said storage means and said auxiliary core to the transfer core in a succeeding stage to drive it to its set state if the transfer core was in its set state and the states of remanence of said storage means and said auxiliary core represented the same binary signal.

6. A sequence detector for binary representative signals in a sequence comprising a plurality of stages each stage including a first, second and third multi-aperture magnetic core, each having a clear and set state of magnetic remanence, said first and third magnetic cores each having a main aperture and a first and second terminal aperture, said second magnetic core having a main aperture, an input aperture and first and second output apertures, a ONE setting winding passing through the first aperture of said first core and the main aperture of said third core, a ZERO setting winding passing through the main aperture of said first core and the first aperture of said second core, a first transfer winding passing through the second aperture of said first core, the first output aperture of said second core, and the input aperture of a second core in a succeeding stage, a second transfer winding passing through the second aperture of said third core, the second output aperture of said second core, and through the input aperture and main aperture of said succeeding stage second core, means for applying a priming current to all of the second apertures of said first and third cores, priming winding means coupled to each one of the second cores, in each one of the stages of said sequence detector in turn, the coupling of said priming winding means being in one sense to the first output aperture and in the opposite sense to the second output aperture of a second core, means for applying current to the one of said ZERO and ONE setting windings of a stage in accordance with the binary bit to be detected by said stage, to drive said first and third cores to respective states of magnetic remanence which together represent the binary bit to be detected, means for applying a signal representing a binary bit to be detected to said priming winding means, and means for driving said first, second and third core to their clear states whereby, the second core of said succeeding state will be driven to its set state provided that the signal applied to said priming winding represents the same binary bit as is represented by the state of remanence of said first and third magnetic cores and said second core was in its set state of magnetic remanence prior to the application of the signal to said priming winding.

7. A sequence detector for detecting binary signals in a predetermined sequence comprising a plurality of detector stages, each of said stages comprising a storage magnetic core having a ZERO state of magnetic remanence and a ONE state of magnetic remanence, means for establishing said storage magnetic core in the state of magnetic remanence representative of the binary bit that is desired to be detected by said stage, said storage magnetic core having a central aperture and a first and second output aperture, a sequence magnetic core having a first and second state of magnetic remanence, a central aperture and an output aperture, a priming winding extending successively to the storage cores and auxiliary cores of each of said stages through their first and second apertures in an opposite sense and through the auxiliary core central aperture, a transfer winding extending through the output aperture of said sequence core, through the first and second output apertures of said storage core with an opposite sense to one another, through the main aperture of said auxiliary core, and back through the main aperture of the sequence core in the succeeding stage, means for driving the sequence magnetic core in a first stage to its first state of magnetic remanence, means for applying a binary signal to be detected to said priming winding means, and means for driving all the cores in a stage to induce a current in said transfer winding for driving the sequence core of a succeeding stage to its first state of magnetic remanence, if the binary bit applied to said priming winding means corresponds to the storage state of said storage core and said sequence core was in its first state of magnetic remanence.

8. A sequence detector for binary signals in a sequence comprising a plurality of stages in sequence, each stage including means for storing a sequence signal, said means for storing a sequence signal comprising a multiaperture magnetic ferrite core having an input aperture, two output apertures and a main aperture, each stage further including magnetic storage means having a zero and a one state of magnetic remanence, means for driving each magnetic storage means to a state of remanence representative of one of the binary signals to be detected in said sequence, priming winding means for applying binary signals to be detected to all the stages of said sequence detector, means at each stage responsive to a binary signal from said priming winding means for storing an indication thereof including an auxiliary magnetic core, said priming winding means including a winding coupled to each of said multiaperture cores by passing through the two output apertures with an opposite sense and being coupled to each said auxiliary magnetic core, means for applying a magnetomotive drive alternatively to alternate stages of said register for producing a second sequence signal from a stage which is storing a sequence signal and a binary signal indication which is identical with the representative state of magnetic remanence of the magnetic storage means of said stage, and means for applying said second sequence signal to a succeeding stage for storage.

References Cited by the Examiner
UNITED STATES PATENTS

| | | | |
|---|---|---|---|
| 2,936,446 | 5/1960 | Rosenberg | 340—174 |
| 3,015,813 | 1/1962 | Tyrlick | 340—347 |

ROBERT C. BAILEY, *Primary Examiner.*

MALCOLM A. MORRISON, *Examiner.*